(12) United States Patent
Basu et al.

(10) Patent No.: US 11,970,103 B2
(45) Date of Patent: Apr. 30, 2024

(54) CARGO DELIVERY SYSTEM ADAPTER FOR AN ELECTRIC VEHICLE

(71) Applicant: GM CRUISE HOLDINGS LLC, San Francisco, CA (US)

(72) Inventors: Rajat Basu, San Francisco, CA (US); Vincent Falzon, San Francisco, CA (US); Jordan Hart, San Francisco, CA (US); Miles Kodama, Menlo Park, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 119 days.

(21) Appl. No.: 17/546,549

(22) Filed: Dec. 9, 2021

(65) Prior Publication Data

US 2022/0097590 A1 Mar. 31, 2022

Related U.S. Application Data

(62) Division of application No. 16/588,065, filed on Sep. 30, 2019, now Pat. No. 11,220,200.

(51) Int. Cl.
| | |
|---|---|
| *B60P 1/64* | (2006.01) |
| *B60P 7/13* | (2006.01) |
| *B60R 11/00* | (2006.01) |
| *B62B 3/02* | (2006.01) |
| *B62B 5/00* | (2006.01) |
| *B65G 67/20* | (2006.01) |

(52) U.S. Cl.
CPC ............. *B60P 1/649* (2013.01); *B60P 1/6409* (2013.01); *B60P 1/6436* (2013.01); *B60P 7/13* (2013.01); *B60R 11/00* (2013.01); *B62B 3/022* (2013.01); *B62B 5/00* (2013.01); *B65G 67/20* (2013.01); *B60R 2011/0029* (2013.01)

(58) Field of Classification Search
CPC ................................ B60P 1/649; B60P 1/6436
USPC .......................... 414/541, 340, 343, 345, 347
See application file for complete search history.

(56) References Cited

U.S. PATENT DOCUMENTS 3,439,822 A * 4/1969 Miklos .................. B60P 1/6436
                                                   296/35.3
5,052,879 A    10/1991 Wolfe
(Continued)

FOREIGN PATENT DOCUMENTS

| CA | 2887266 A1 | 10/2016 |
|---|---|---|
| DE | 29515128 U1 | 12/1995 |
| DE | 29608955 U1 | 9/1996 |

OTHER PUBLICATIONS

International Search Report and Written Opinion for International Application No. PCT/US2019/068318, dated Oct. 26, 2020, 15 pages.

*Primary Examiner* — Jonathan Snelting
(74) *Attorney, Agent, or Firm* — Michael DiCato

(57) ABSTRACT

The present technology provides a cargo adapter that can be inserted into a passenger compartment of a mixed-use vehicle that can be anchored to existing anchor points in the vehicle. The cargo adapter can then receive, secure, and support a cargo locker in a way that safely secures the cargo and avoids wear on the interior surfaces of the passenger compartment. The present technology further provides a system for transporting a cargo locker to a vehicle and inserting the cargo adapter and cargo locker into the vehicle quickly and easily.

12 Claims, 13 Drawing Sheets

(56) References Cited

U.S. PATENT DOCUMENTS

| | | | |
|---|---|---|---|
| 5,308,214 A | 5/1994 | Crain et al. | |
| 6,082,957 A | 7/2000 | Kupka, Jr. | |
| 7,207,765 B1 | 4/2007 | Egan | |
| 8,191,688 B2* | 6/2012 | Bogelein | B60L 50/66 |
| | | | 180/68.5 |
| 8,398,356 B2 | 3/2013 | Sandoz | |
| 9,248,771 B2 | 2/2016 | Wisniewski | |
| 9,266,463 B2 | 2/2016 | Hindy | |
| 9,505,331 B2 | 11/2016 | Timonen | |
| 11,001,186 B2 | 5/2021 | Bryant | |
| 2006/0078409 A1* | 4/2006 | Takeda | B62B 3/04 |
| | | | 198/300 |
| 2013/0011229 A1* | 1/2013 | Barry | B61D 47/00 |
| | | | 414/340 |
| 2014/0205410 A1 | 7/2014 | Wisniewski | |
| 2016/0059765 A1 | 3/2016 | Stakoe et al. | |
| 2019/0047479 A1 | 2/2019 | Faruque et al. | |

\* cited by examiner

— CARGO DELIVERY SYSTEM ADAPTER FOR AN ELECTRIC VEHICLE

CROSS-REFERENCE TO RELATED APPLICATIONS

This application is a divisional of U.S. application Ser. No. 16/588,065, filed on Sep. 30, 2019, entitled, CARGO DELIVERY SYSTEM ADAPTER FOR AN ELECTRIC VEHICLE, which is hereby expressly incorporated by reference in its entirety.

TECHNICAL FIELD

The present technology pertains to a cargo delivery system for use with a mixed use, passenger/delivery vehicle, and more specifically pertains to a cargo delivery system adapter for a mixed-use electric vehicle.

BACKGROUND

An electric vehicle is a motorized vehicle wherein the motor is powered by batteries that are usually contained directly under the floor of a passenger or delivery compartment of the vehicle. To accommodate the size and quantity of batteries needed to provide sufficient range for an electric vehicle, the floor of an electric vehicle is made of a thin sheet metal and the batteries are directly under the sheet metal. This makes mounting or securing anything into the floor an engineering and design challenge. If something like seats or a cargo rack needs to be mounted to the floor, extra structure needs to be provided, which can limit areas that are suitable for battery placement.

An autonomous vehicle is a motorized vehicle that can navigate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system.

Some autonomous vehicles are also electric vehicles which combines the above aspects of each into a single vehicle.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
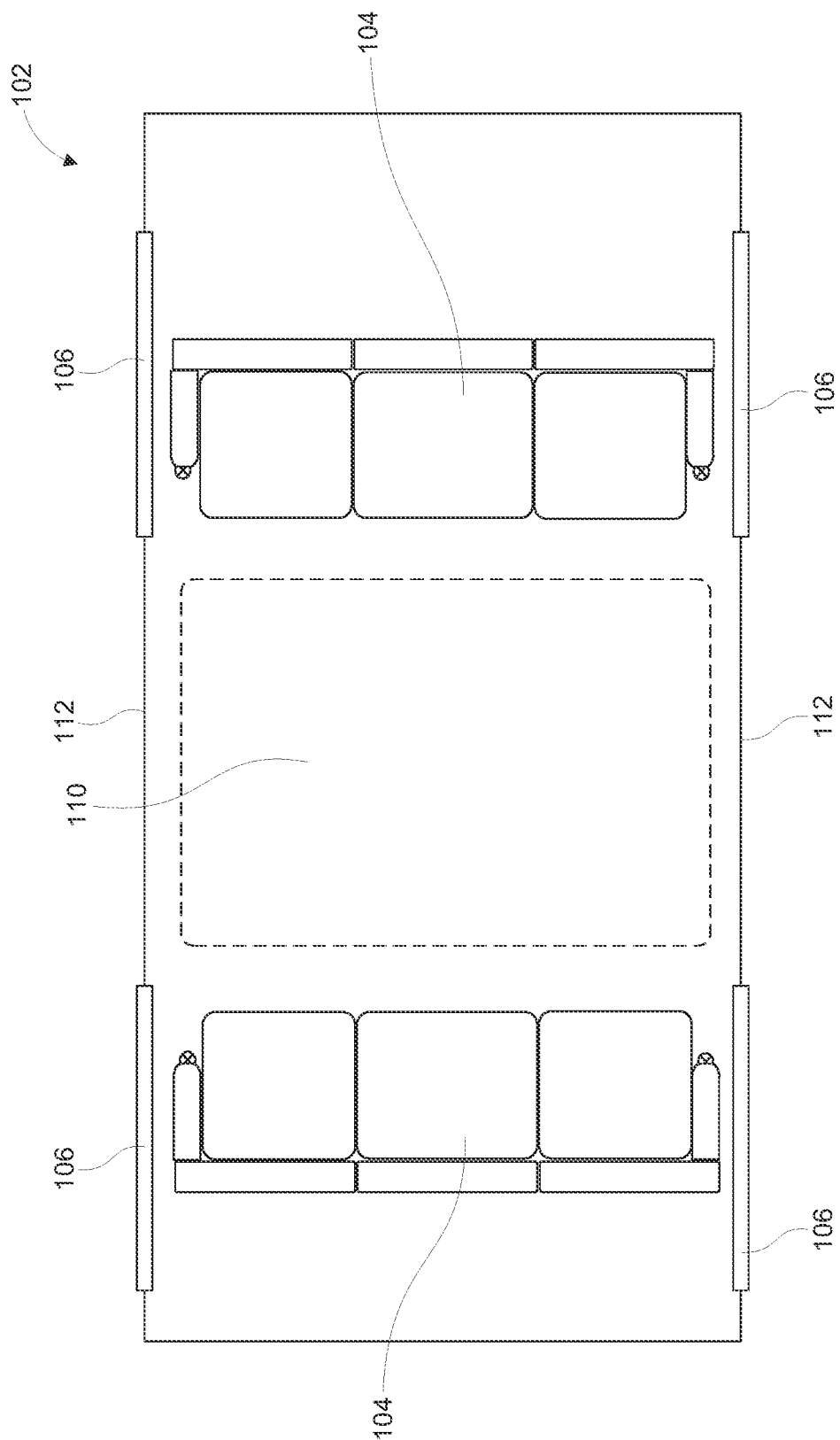
FIG. 1 shows a top view of an example electric vehicle in accordance with some aspects of the present technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

The disclosed technology addresses the need in the art for a mixed use (passenger/cargo) electric vehicle that can be quickly converted from passenger use to cargo use and back.

Commercial vehicles, especially those that primarily handle passenger rides, suffer from periods of underutilization during off-peak-demand hours. For example, a passenger vehicle is most likely to be utilized during weekday commute hours, but for the rest of the day, large portions of a fleet of vehicles may be idle. One solution to this problem is to utilize the vehicles for cargo delivery during the off-peak hours.

However, there are challenges in converting a passenger vehicle into a cargo vehicle during limited hours. First, the vehicle must be capable of being quickly loaded and unloaded. In some cases, in order to accommodate this, the vehicle passenger compartment may need to be converted or adjusted to accommodate cargo.

Second, the number of places that cargo can be secured is very limited. The floor of the van may already be crowded with areas to hold seats, and areas designed to accommodate passenger leg room need to be clear of obstructions that might trip a passenger or make the area uncomfortable. An additional problem in the case of electric vehicles is that the floor of electric vehicles is thin, and cannot be designed with extra areas to tie down cargo without limiting area needed for battery mounts.

Additionally, an interior space that is designed to carry passengers comfortably is not well suited to carrying cargo. An interior space for passenger transport typically includes carpet or fabric-covered surfaces, and comfortable seating. Both the covered surfaces and the seating are prone to getting dirty and to tearing when cargo is dragged along these surfaces.

Accordingly, there is a need for a solution that will allow a mixed use vehicle to be quickly converted from a vehicle suited for passenger transport to a vehicle suited for cargo transport, while accommodating electric vehicle limitations, and protecting the interior portions of the vehicle from abuse and wear by the cargo.

The present technology provides a cargo adapter that can be inserted into a passenger compartment of a mixed use electric vehicle that can be anchored to existing anchor points. The cargo adapter can then receive, secure, and support a cargo locker in a way that safely secures the cargo and avoids wear on the interior surfaces of the passenger compartment.

The present technology further provides a system for transporting a cargo locker to an electric vehicle and inserting the cargo adapter and cargo locker into the electric vehicle quickly and easily.

FIG. 1 illustrates an example top-down view of passenger compartment of electric vehicle 102. As illustrated, electric vehicle 102 has its doors 106 open thereby exposing the passenger compartment. In the depicted arrangement, the doors 106 open by sliding outwards towards a front and a rear of the electric vehicle 102, respectively, to reveal opening 112. The passenger compartment includes seats 104 and floor space 110.

In some embodiments, electric vehicle 102 can be a commercial vehicle that is used for the purposes of providing rideshare services to passengers that interact with a ridesharing service. Accordingly, the passenger compartment of electric vehicle 102 can include comfortable interior coverings such as cloth or leather seat covers and carpeting on the floor space 110 throughout the passenger compartment.

Figure 2A:
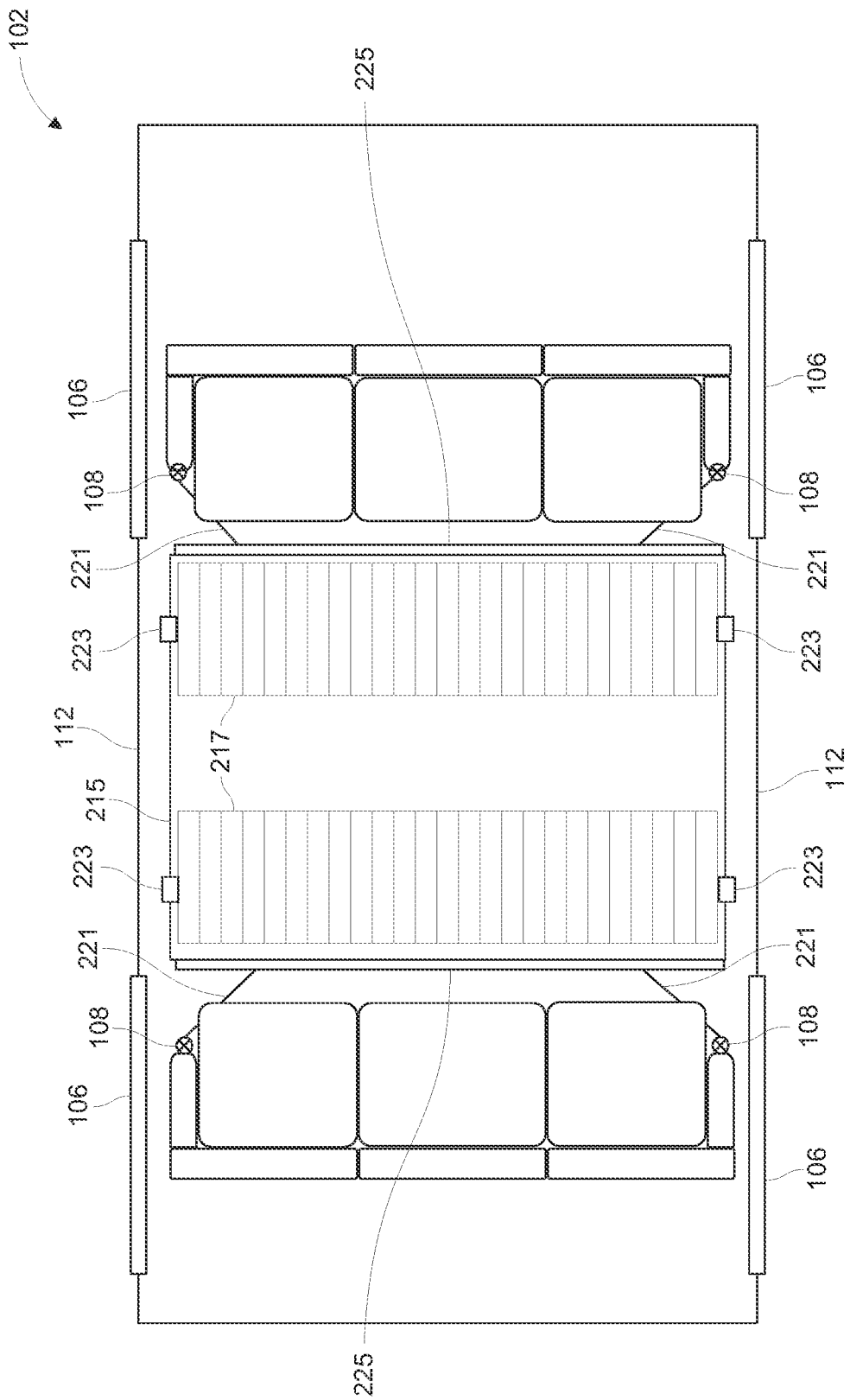
FIG. 2A shows a top view of an example electric vehicle having a cargo adapter installed in accordance with some aspects of the present technology.

However, in periods of lower passenger demand it may be desirable to use electric vehicle 102 to transport cargo. FIG. 2A illustrates a top-down view of the interior of electric vehicle 102 after it has been adapted to transport cargo. Notably floor space 110 has been taken up by cargo adapter 215.

Cargo adapter 215 can be a platform configured to be secured to cargo anchors 108 in the interior of electric vehicle 102. In some embodiments, cargo adapter 215 can be secured to cargo anchors using load straps 221. Load straps 221 can be self tightening load straps or ratchet style load straps. Cargo anchors 108 can be D-rings or other structures configured to be engaged by load straps 221.

As noted above, one limitation of electric vehicles is that their floors are made of thin sheet metal and have batteries immediately below them which does not leave many opportunities to install cargo anchors 108. As such cargo anchors 108 can be integrated into seats 104. Alternatively cargo anchor 108 can be installed into the same structure securing seats 104 to the body of electric vehicle. In some embodiments, cargo anchors do not need to be in the floor surface and can instead be installed into side frame of electric vehicle 102.

In some embodiments, while it may increase cost and create engineering challenges, the present technology does envision embodiments wherein other cargo anchors are possible. For example, a click-in, easy release binding mechanism can be located directly under cargo adapter 215.

Any suitable mounting mechanism to secure cargo adapter 215 to electric vehicle 102 can be used.

Cargo adapter 215 can be made of metal, for example aluminum or titanium, etc., a composite material, plastic, wood, or other lightweight but strong material.

Cargo adapter 215 is configured to be just slightly less than the width of the opening 112 created by the open electronic vehicle 102 doors 106, so that it can be easily slid in or slid out of electric vehicle 102.

In some embodiments, seats 104 can be configured to fold away from floorspace 110 to provide greater room to receive cargo adapter 215 and to secure cargo adapter 215 to cargo anchors 108.

Cargo adapter 215 is adapted to receive a cargo locker. In order to easily receive the cargo locker, cargo adapter 215 includes roller bearings 217 which can permit the cargo locker or other cargo to be easily rolled into place on cargo adapter 215. Once the cargo locker is in place, spring-loaded clips 223 can engage with the cargo locker to prevent the cargo locker from continuing to roll out the other side of the vehicle and to secure the cargo locker into place. The spring-loaded clips 223 are configured with a cam surface on the outside surface (side facing the door of electric vehicle 102) that can be pushed out of the way when the cargo locker is inserted into the vehicle through the door, and can in turn cause compression of the spring. The spring can remain compressed while the cargo locker passes over the cam surface. Once the cargo locker has cleared the cam surface the spring-loaded clip 223 can engage the side of the cargo locker with the inside securing surface (side facing the interior of electric vehicle 102) to secure it in place. In this way, any movement of the cargo locker in a first direction (e.g. moving from inside the vehicle to the outside) is prevented without intervention to disengage the spring-loaded clip 223.

Cargo adapter 215 can also include side struts 225. Side struts 225 are configured to guide the cargo locker onto cargo adapter 215 and are configured to prevent movement in a second direction (e.g. forward or rearward movement), with respect to electric vehicle 102, inside the cabin of electric vehicle 102. The first direction may be orthogonal to the second direction as depicted.

Figure 2B:
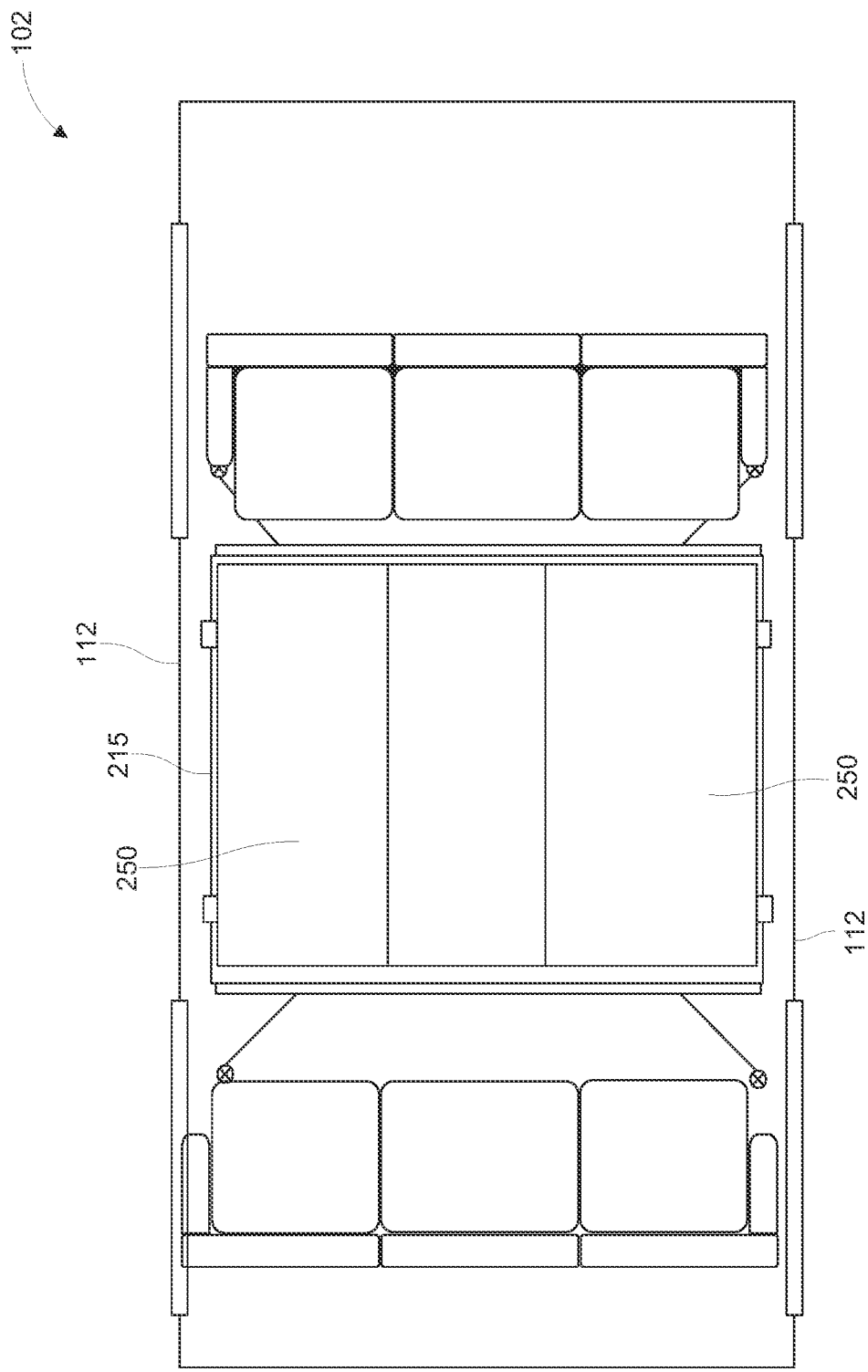
FIG. 2B shows a top view of an example electric vehicle having a cargo adapter securing a cargo locker in accordance with some aspects of the present technology.

FIG. 2B illustrates further top-down view of the interior of electric vehicle 102. In FIG. 2B cargo adapter 215 has been secured inside electric vehicle 102 and cargo locker 250 has been installed onto cargo adapter 215.

Figure 3:
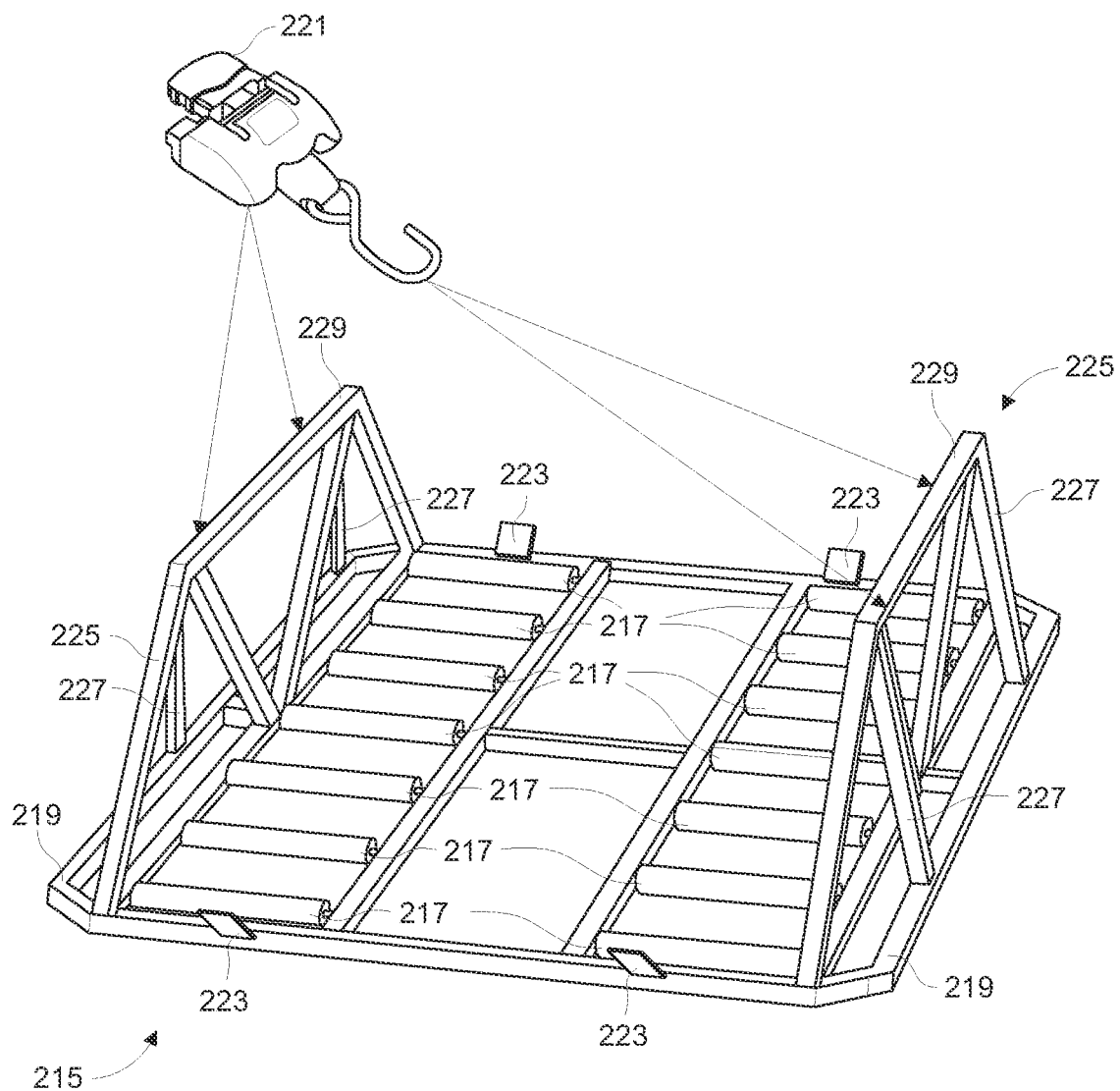
FIG. 3 shows a perspective view of an example cargo adapter in accordance with some aspects of the present technology.

FIG. 3 illustrates a detailed perspective view of cargo adapter 215. Cargo adapter 215 includes a frame that forms a horizontal platform that supports a low friction surface such as roller bearings 217 that are configured to allow cargo locker 250 to roll across cargo adapter 215 until cargo locker 250 is engaged by spring-loaded clips 223 or latches to prevent cargo locker 250 from rolling off the far side of cargo adapter 215. The spring-loaded clips 223 are configured with a cam surface on the outside surface (side facing the door of electric vehicle 102) that can be pushed out of the way when the cargo locker is inserted into the vehicle through the door, and can in turn cause compression of the spring. The spring can remain compressed while the cargo locker passes over the cam surface. Once the cargo locker has cleared the cam surface the spring-loaded clip 223 can engage the side of the cargo locker with the inside securing surface (side facing the interior of electric vehicle 102) to secure it in place.

Additionally, cargo adapter 215 includes vertical struts 225 which are configured to guide cargo locker 250 onto cargo adapter 215 and to prevent cargo locker 250 from sliding forward or backward in the interior of electric vehicle 102 during transport. Each vertical strut 225 includes an angled support 227 coupled to an outer edge 227 of the frame 219 and a top rail 229 of the vertical strut 225. The angled support 227 receives loads from the vertical strut 225 as cargo locker 250 attempts to slide forwards or backwards in the interior of electric vehicle 102 during transport. As shown, in at least one embodiment the vertical strut 225 is in a first plane, orthogonal to the frame 219 which is in a second plane. The angled support 227 may reside in a third plane orthogonal to both the first and second planes.

In some embodiments, the frame of cargo adapter 215 can form one or more holes for receiving a cotter pin. In some embodiments, the hole(s) can be formed in the vertical struts 225. The hole(s) are configured to receive a portion of a cotter pin while another portion is engaged with cargo locker 250 to keep the cargo locker 250 in place in electric vehicle 105. The hole(s) can also be used to secure cargo adapter to a dolly as explained below.

Additionally FIG. 3 illustrates straps 221 which can engage vertical struts 225 or another part of cargo adapter 215 frame and can secure cargo adapter 215 to cargo anchors 108.

Figure 4A:
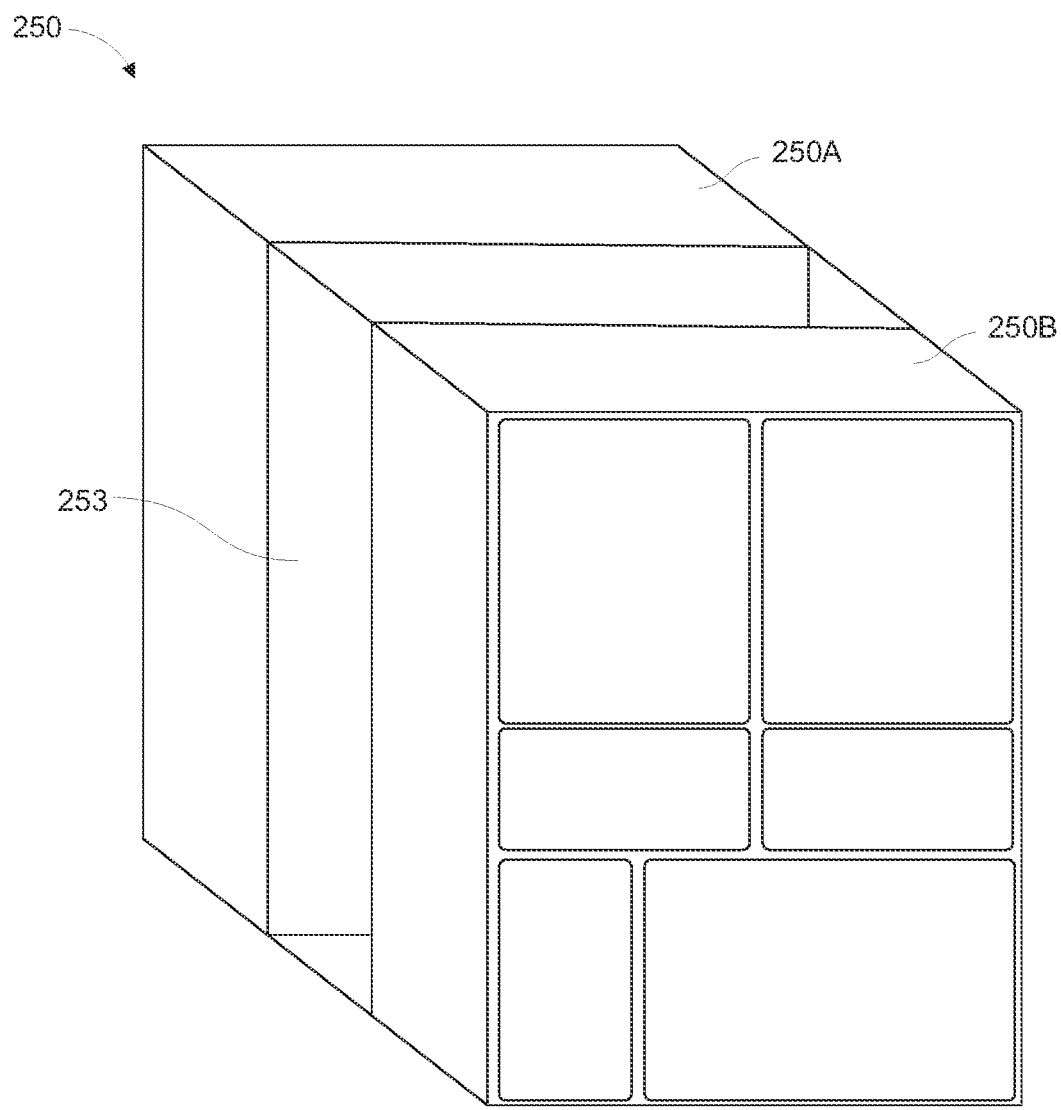
FIG. 4A shows a perspective view of an example cargo locker in accordance with some aspects of the present technology.

FIG. 4A illustrates a perspective view of cargo locker 250. As illustrated in FIG. 4A cargo locker 250 has two portions. First side portion 250A is configured to be accessible from the first side of the vehicle. Second side portion 250B is configured to be accessible from the second side of vehicle. In some embodiments, first side portion 250A and second side portion 250B can be separated by a volume 253 of open space when it is not desired to have a cargo locker with a depth great enough to take up half of the vehicle. This structure allows cargo locker to carry more cargo and to be easy to access each compartment from one side or the other of the vehicle.

Figure 4C:
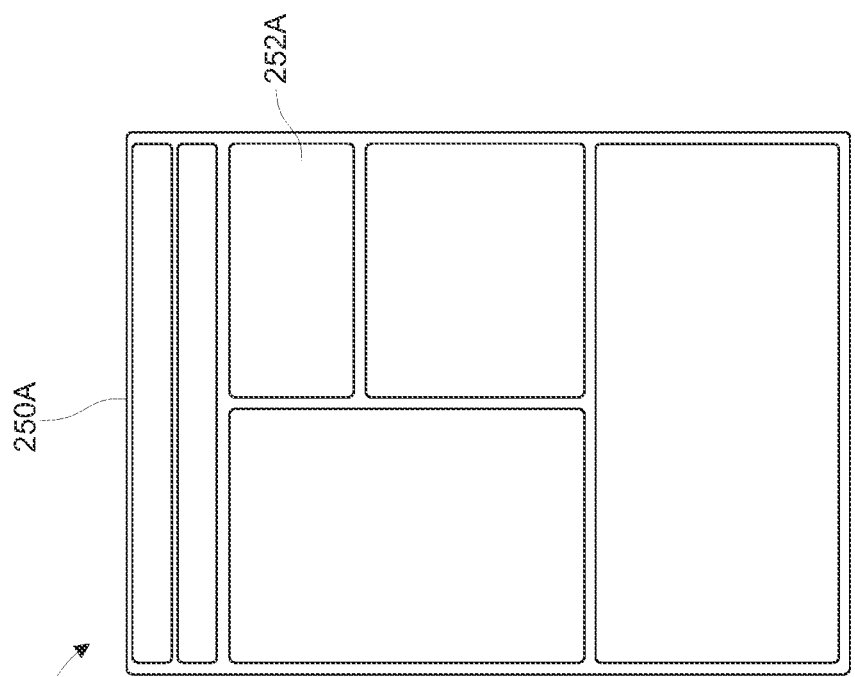
FIG. 4C shows a driver side view of an example cargo locker in accordance with some aspects of the present technology.
Figure 4B:
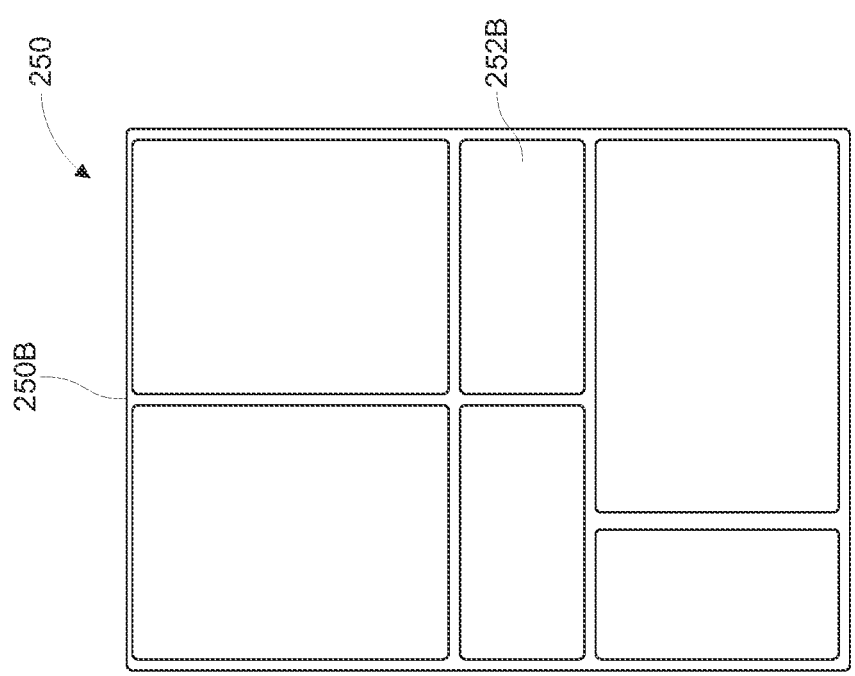
FIG. 4B shows a First side view of an example cargo locker in accordance with some aspects of the present technology.

FIG. 4B shows a front view of passenger-side portion 250A of cargo locker 250. Passenger-side portion 250A has several cargo compartments and includes an access interface 252A. Likewise FIG. 4C illustrates second side portion 250B of cargo locker 250 second side portion 250B has several cargo compartments and includes an access interface 252B. Access interfaces 252A and 252B can be computer interfaces that are configured to authenticate a user and to open a cargo compartment so the user can deposit or retrieve cargo from one of the cargo compartments.

FIGS. 5A, 5B, 5C, and 5D illustrate detailed views of dolly 302 that is configured to transport cargo locker 250 and cargo adapter 250 to and from electric vehicle 102.

Figure 5A:
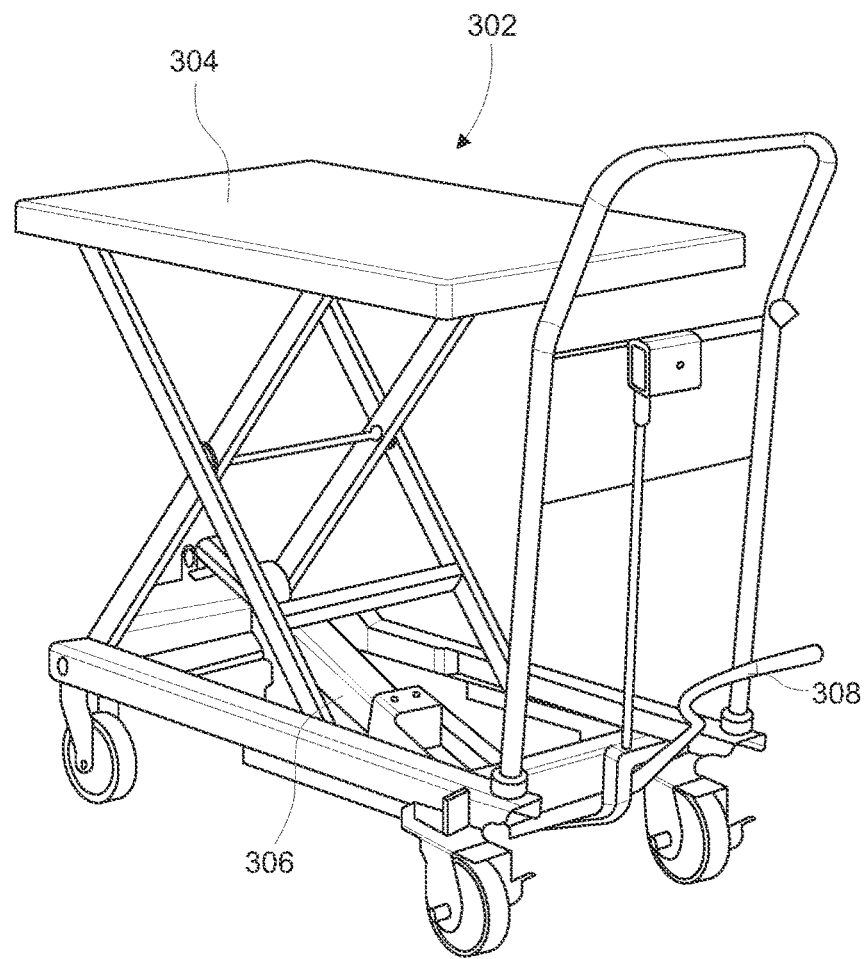
FIG. 5A, FIG. 5B, FIG. 5C, and FIG. 5D show example illustrates of a system for transporting and loading a cargo adapter and a cargo locker into electric vehicle in accordance with some aspects of the present technology.

FIG. 5A illustrates dolly 302 having surface 304 for supporting cargo locker 250. Dolly 302 can be an adjustable height dolly so that the dolly can be raised or lowered in order to lift cargo locker 250 to the same height as the floor of electric vehicle 102. Dolly 302 can be adjusted using jack handle 308 to expand or contract jack piston 306. While dolly 302 is illustrated as a manual dolly, it can be an automatic dolly, and can be powered.

Dolly 302 can be configured with at least two preset heights. A first height being substantially equal to the height of the floor of the electric vehicle, and a second height being a lower height than the first height and is used for transporting the cargo locker. In some embodiments the dolly 302 can be capable of being adjusted to any height. The dolly 302 could also have markings based on approximate known heights that the dolly 302 is most commonly operated at.

Figure 5B:
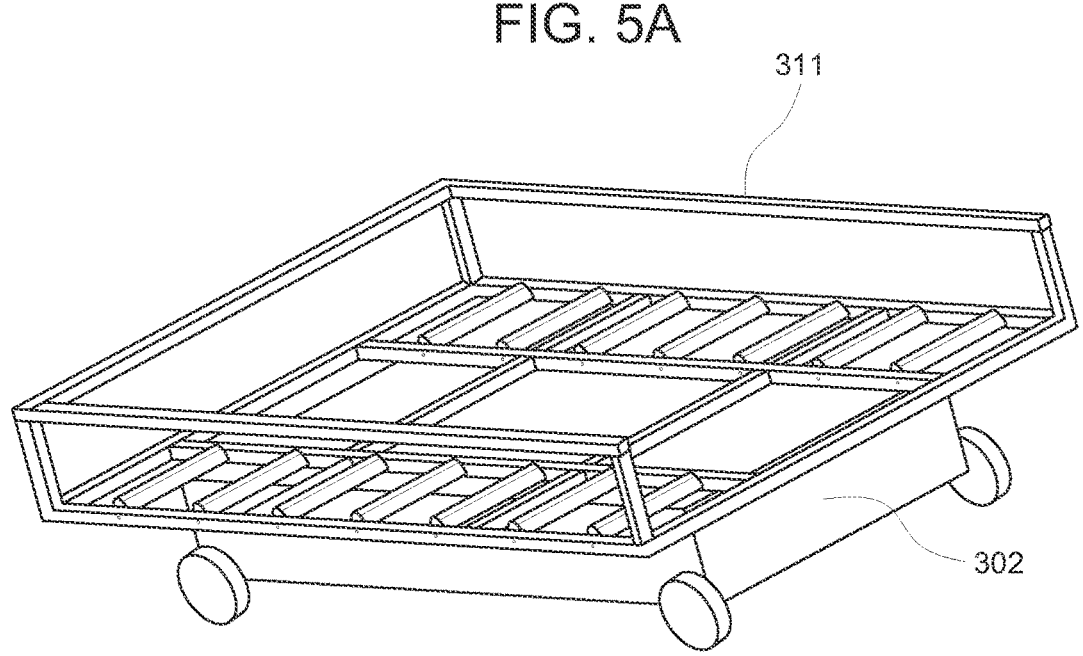

FIG. 5B illustrates dolly 302 with cargo locker platform 311 mounted to surface 304 of dolly 302. Cargo locker platform 311 is configured to receive cargo locker 250 and to secure it so that cargo locker 250 does not roll off cargo locker platform 311. Just as with cargo adapter 215 cargo locker platform 311 can have a at least one strut to guide cargo locker 250 onto cargo locker platform 311 and to prevent cargo locker 250 from falling off dolly 302. Additionally, cargo locker platform 311 can have roller bearings to help receive cargo locker 250 onto cargo locker platform 311 and to facilitate rolling cargo locker 250 off cargo locker platform 311 into electric vehicle 102 and onto cargo adapter 215.

In some embodiments, cargo locker platform 311 can include a securing mechanism to secure cargo locker 250 to cargo locker platform 311. In some embodiments, cargo locker 250 can include a recess configured to receive a cotter pin, and cargo locker platform 311 can also include a complimentary borehole such that the cotter pin can travel through the borehole on cargo locker platform 311 and be received in the recess in cargo locker 250, thus securing cargo locker 250 to cargo locker platform 311.

Figure 5C:
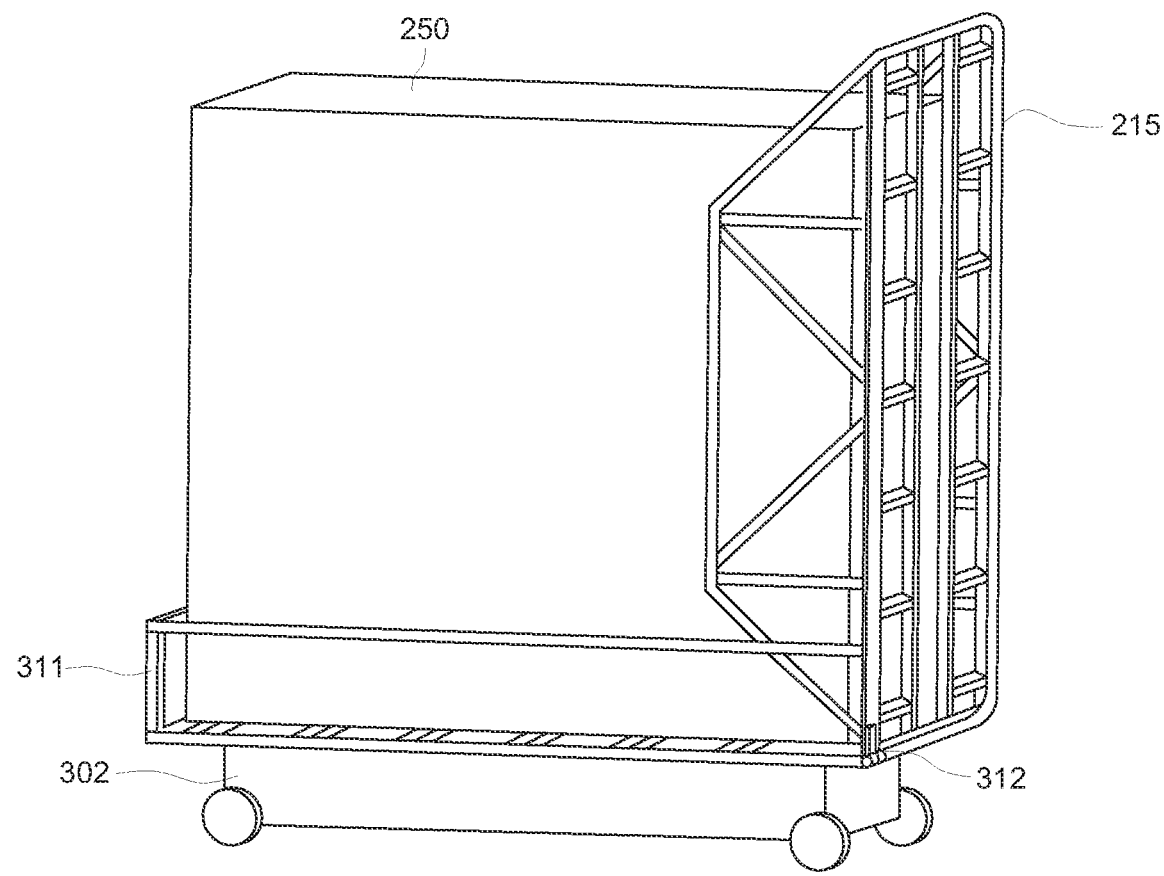

FIG. 5C illustrates dolly 302 in a transport configuration for transporting cargo locker 250 and cargo adapter 215. In this configuration cargo locker 250 is supported by cargo locker platform 311, and cargo locker 250 can be secured to cargo locker platform 311 by a securing mechanism such as a cotter pin.

Figure 5D:
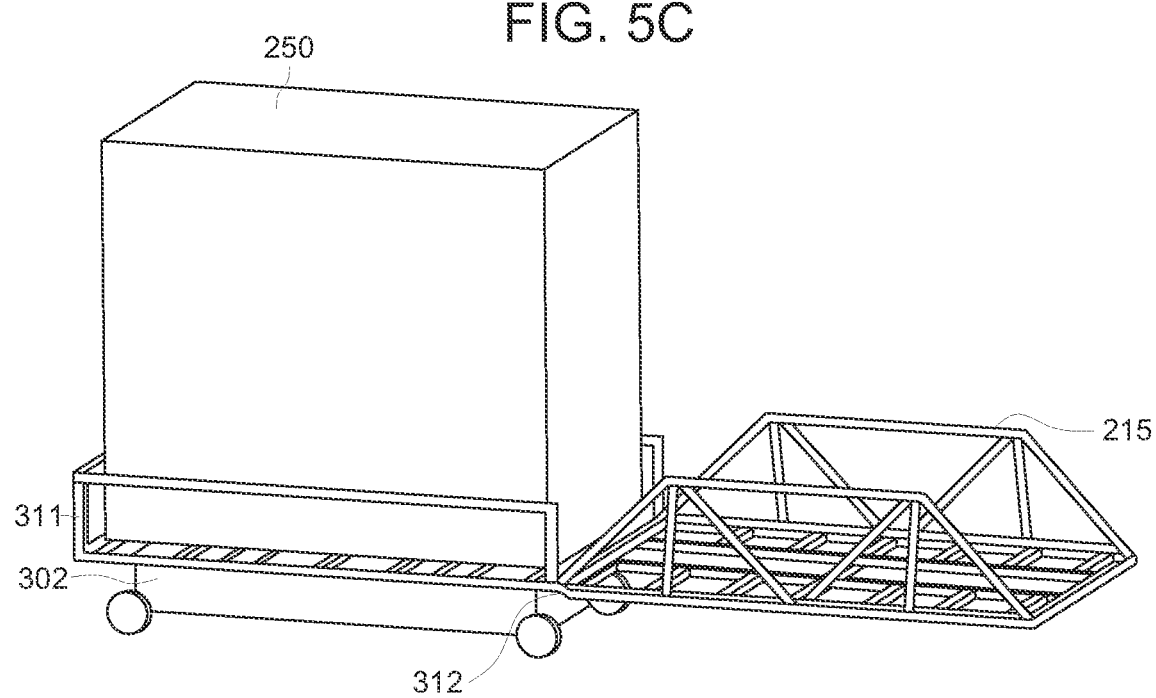

Cargo adapter 215 is shown in a vertical position. Cargo adapter 215 can rest in a sleeve of a half hinge 312. Cargo adapter 215 can be translated about a pivot of half hinge 312 into a horizontal position as illustrated in FIG. 5D. While a half hinge 312 is reflected in FIG. 5C, any type of hinge mechanism can be used.

Since, in some embodiments, cargo adapter 215 is not secured in the sleeve of the half hinge 312 but rather rests in the sleeve of the half hinge under its own weight. Cargo adapter 215 can be secured to cargo locker 250 by a restraining mechanism such as a cotter pin or clip to keep cargo adapter in the vertical position while dolly 302 is in the transport configuration.

FIG. 5D illustrates dolly 302 in a loading/unloading configuration. In this configuration, cargo adapter 215 can be inserted into electric vehicle 102 and the combined cargo adapter 215 and cargo locker platform 311 can act as a bridge to guide cargo locker 250 into electric vehicle 102. Once cargo locker 250 is in place, cargo adapter 215 can be slid out of half hinge 312 to disengage from cargo locker platform 311.

However, in some embodiments, no hinge is required, and cargo adapter 215 can be lifted off dolly 302 and placed into electric vehicle 102.

In some embodiments, dolly 302 can include at least one appendage that can be used to center an align dolly 302 relative to the vehicle entrance from a height and fore-aft perspective.

FIGS. 6A, 6B, 6C, 6D, 6E, and 6F illustrate an example sequence for transporting cargo locker 250, installing cargo adapter 215, and then inserting cargo locker 250 into electric vehicle 102.

Figure 6A:
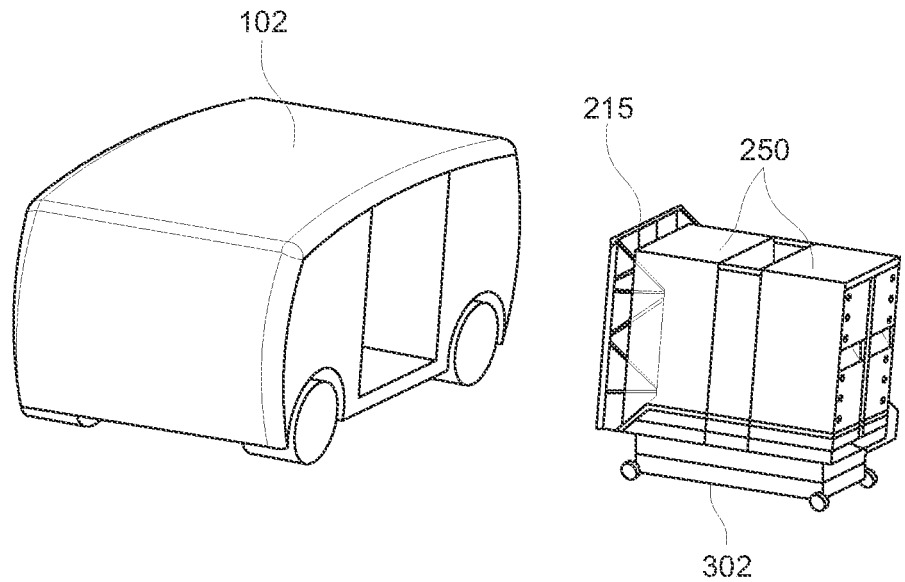
FIG. 6A, FIG. 6B, FIG. 6C, FIG. 6D, FIG. 6E, and FIG. 6F illustrate an example sequence of steps for loading a cargo adapter and a cargo locker into electric vehicle in accordance with some aspects of the present technology.
Figure 6B:
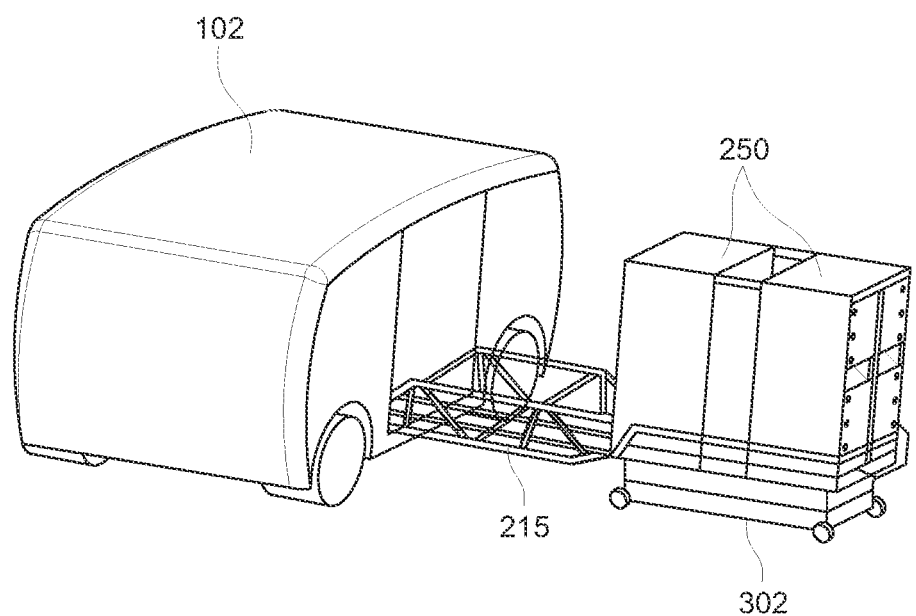

FIG. 6A illustrates dolly 302 in transport position carrying cargo locker 250 and with cargo adapter 215 secured in a vertical position. When dolly 302 gets close enough to electric vehicle 102 an operator can rotate cargo adapter 215 from the vertical position into a horizontal position putting dolly 302 into an unloading configuration. In some embodiments, dolly 302 can include a proximity sensor to detect a good distance in which to rotate cargo adapter 215 into the horizontal position. If operator of dolly 302 waits too long, cargo adapter 215 will bump into the top of electric vehicle 102 when it is being rotated from the vertical position to the horizontal position. If operator of dolly 302 rotates cargo adapter 215 from the vertical position to the horizontal position too early, the dolly and cargo adapter 215 will be too far away from electric vehicle 102 and the cargo adapter will have to be carried to electric vehicle 102. In other words, based on the dimensions of the cargo adapter 215 and opening 112, there is a determined range of distances in which an operator can properly rotate the cargo adapter 215 into the electric vehicle 102. The dolly 302 may indicate to the operator whether a distance between the dolly 302 and the electric vehicle 102 is within the determined range of distances.

Figure 6C:
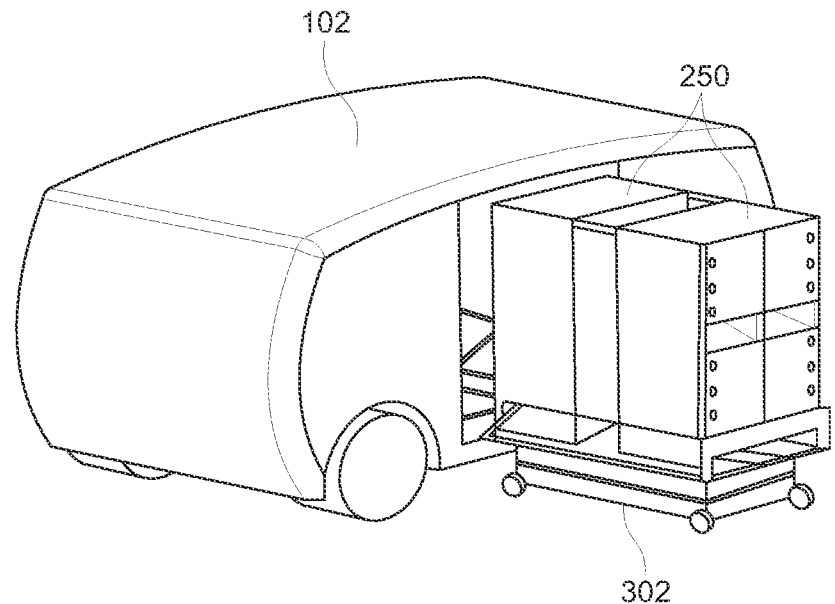
Figure 6D:
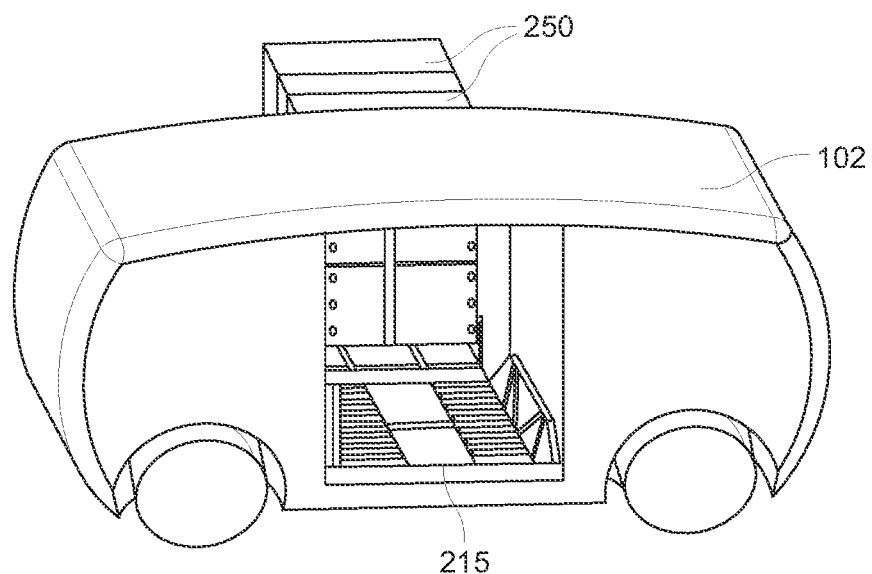

FIG. 6C illustrates dolly 302 in the unloading configuration after operator has pushed dolly 302 closer to electric vehicle 102 to move cargo adapter 215 into position in electric vehicle 102. FIG. 6D shows cargo adapter 215 in position in electric vehicle 102. At this time, operator of the dolly can climb into electric vehicle 102 and secure cargo adapter 215 into place.

Figure 6E:
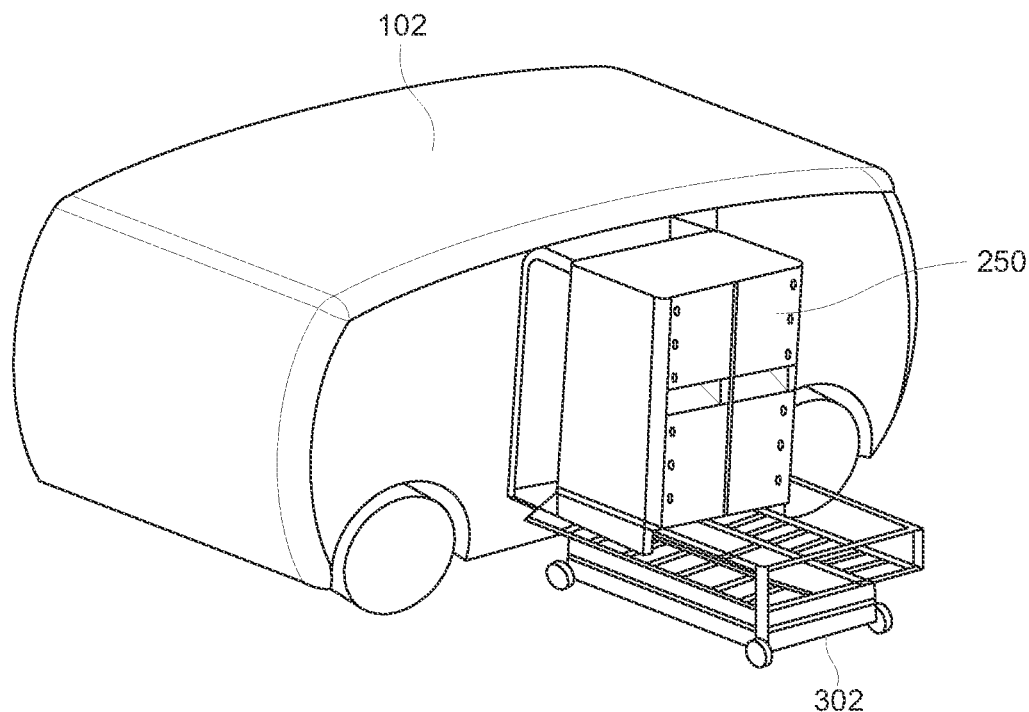
Figure 6F:
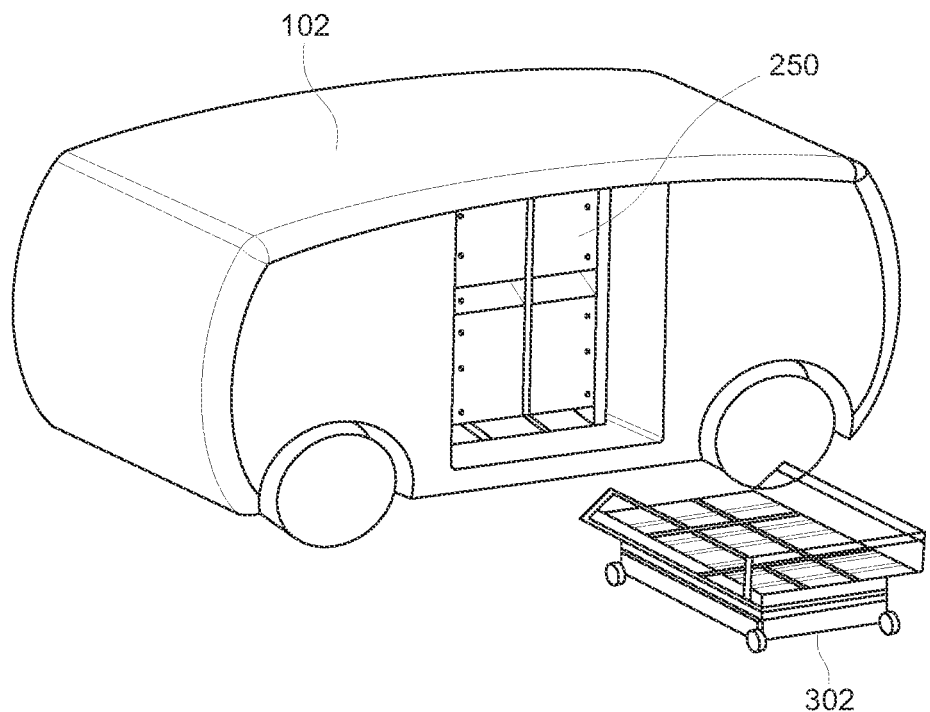

FIG. 6E illustrates cargo locker 250 being loaded into electric vehicle 102. An operator can push cargo locker 250 along roller bearings of cargo locker platform 311 and onto roller bearings of cargo adapter 215 until cargo locker 250 is fully in electric vehicle 102 as illustrated in FIG. 6F.

In some embodiments, cargo locker 250 can be configured to take up most or substantially all the room made by open doors 106 of electric vehicle 102.

While aspects of cargo locker 250, cargo adapter 215, dolly 302, and electric vehicle 102 have been described along with various example mechanisms to transport cargo locker 250 to electric vehicle 102, and to install and secure cargo adapter 215 and cargo locker 250 into electric vehicle 102, other mechanisms are possible. Any description of specific mechanisms herein should be considered as examples only in the present technology should not be limited except as recited in the appended claims.

While aspects of the present technology have been discussed with respect to an electric vehicle, it should be appreciated that the technology disclosed herein is equally applicable to any type of vehicle whether or not electric, and regardless of whether the vehicle is a van, truck, or other vehicle.

Thus far the present description has referred to inserting cargo locker 250 into an electric vehicle 102, but in some embodiments, electric vehicle 102 can also be an autonomous driving electric vehicle 102. Therefore, in addition to the physical aspects of the system described herein, in some embodiments, cargo locker 250 is configured to interact with a system for piloting autonomous electric vehicle 102, and for interacting with users.

Figure 7:
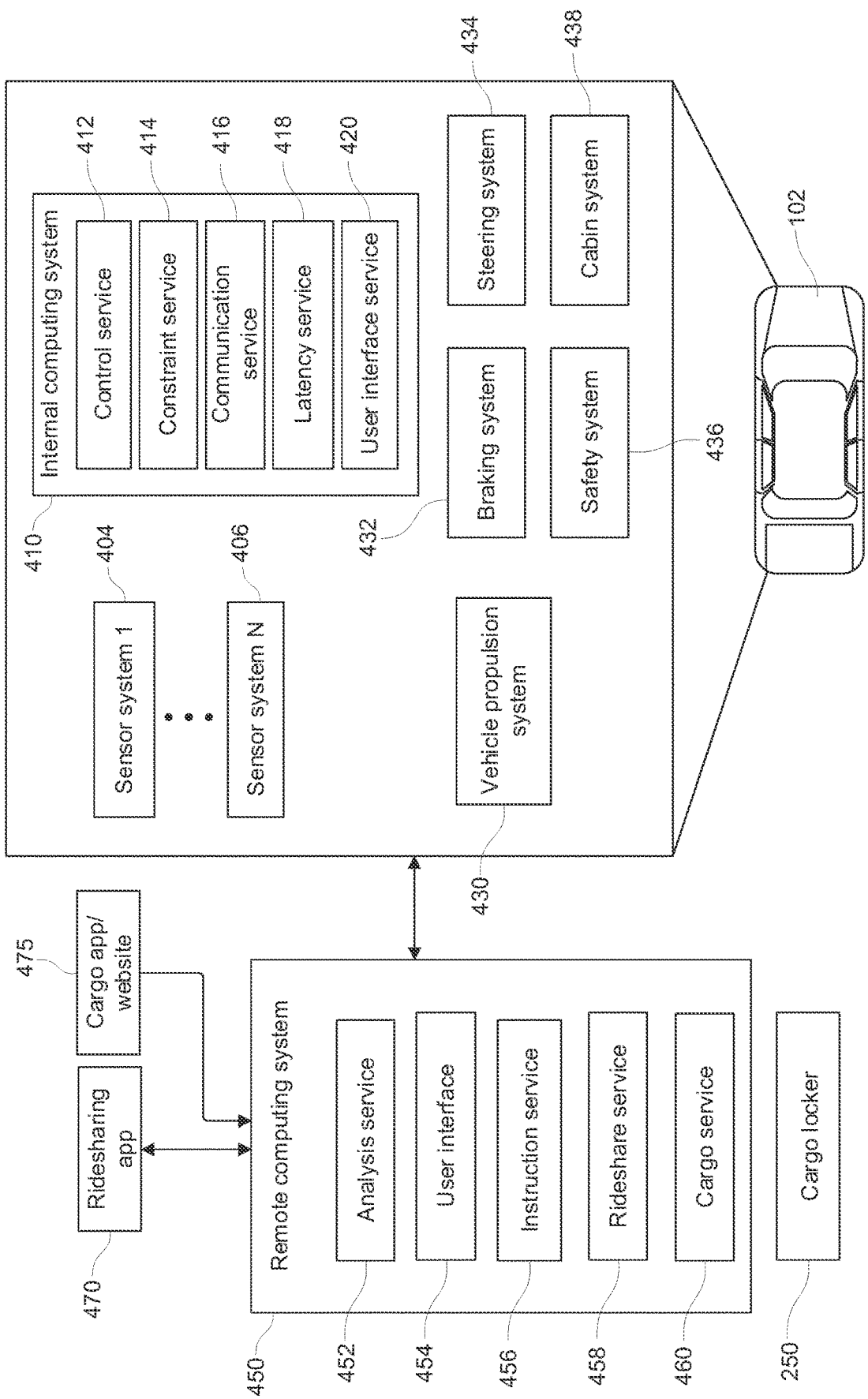
FIG. 7 illustrates an example system for operating an autonomous vehicle in accordance with some aspects of the present technology.

FIG. 7 illustrates an environment that includes an autonomous vehicle 102 in communication with a remote computing system 450.

The autonomous vehicle 102 can navigate about roadways without a human driver based upon sensor signals output by sensor systems 404-406 of the autonomous vehicle 102. The autonomous vehicle 102 includes a plurality of sensor systems 404-406 (a first sensor system 404 through an Nth sensor system 406). The sensor systems 404-406 are of different types and are arranged about the autonomous vehicle 102. For example, the first sensor system 404 may be a camera sensor system, and the Nth sensor system 406 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 102 further includes several mechanical systems that are used to effectuate appropriate motion of the autonomous vehicle 102. For instance, the mechanical systems can include but are not limited to, a vehicle propulsion system 430, a braking system 432, and a steering system 434. The vehicle propulsion system 430 may include an electric motor, an internal combustion engine, or both. The braking system 432 can include an engine brake, brake pads, actuators, and/or any other suitable componentry that is configured to assist in decelerating the autonomous vehicle 102. The steering system 434 includes suitable componentry that is configured to control the direction of movement of the autonomous vehicle 102 during navigation.

The autonomous vehicle 102 further includes a safety system 436 that can include various lights and signal indicators, parking brake, airbags, etc. The autonomous vehicle 102 further includes a cabin system 438 that can include cabin temperature control systems, in-cabin entertainment systems, etc.

The autonomous vehicle 102 additionally comprises an internal computing system 410 that is in communication with the sensor systems 404-406 and the systems 430, 432, 434, 436, and 438. The internal computing system includes at least one processor and at least one memory having computer-executable instructions that are executed by the processor. The computer-executable instructions can make up one or more services responsible for controlling the autonomous vehicle 102, communicating with remote computing system 450, receiving inputs from passengers or human co-pilots, logging metrics regarding data collected by sensor systems 404-406 and human co-pilots, etc.

The internal computing system 410 can include a control service 412 that is configured to control the operation of the vehicle propulsion system 206, the braking system 208, the steering system 434, the safety system 436, and the cabin system 438. The control service 412 receives sensor signals from the sensor systems 404-406 as well communicates with other services of the internal computing system 410 to effectuate operation of the autonomous vehicle 102. In some embodiments, control service 412 may carry out operations in concert one or more other systems of autonomous vehicle 102.

The internal computing system 410 can also include a constraint service 414 to facilitate safe propulsion of the autonomous vehicle 102. The constraint service 416 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 412.

The internal computing system 410 can also include a communication service 416. The communication service can include both software and hardware elements for transmitting and receiving signals from/to the remote computing system 450. The communication service 416 is configured to transmit information wirelessly over a network, for example, through an antenna array that provides personal cellular (long-term evolution (LTE), 3G, 5G, etc.) communication.

In some embodiments, one or more services of the internal computing system 410 are configured to send and receive communications to remote computing system 450 for such reasons as reporting data for training and evaluating machine learning algorithms, requesting assistance from remoting computing system or a human operator via remote computing system 450, software service updates, ridesharing pickup and drop off instructions etc.

The internal computing system 410 can also include a latency service 418. The latency service 418 can utilize timestamps on communications to and from the remote computing system 450 to determine if a communication has been received from the remote computing system 450 in time to be useful. For example, when a service of the internal computing system 410 requests feedback from remote computing system 450 on a time-sensitive process, the latency service 418 can determine if a response was timely received from remote computing system 450 as information can quickly become too stale to be actionable. When the latency service 418 determines that a response has not been received within a threshold, the latency service 418 can enable other systems of autonomous vehicle 102 or a passenger to make necessary decisions or to provide the needed feedback.

The internal computing system 410 can also include a user interface service 420 that can communicate with cabin system 438 in order to provide information or receive information to a human co-pilot or human passenger. In some embodiments, a human co-pilot or human passenger may be required to evaluate and override a constraint from constraint service 414, or the human co-pilot or human passenger may wish to provide an instruction to the autonomous vehicle 102 regarding destinations, requested routes, or other requested operations.

As described above, the remote computing system 450 is configured to send/receive a signal from the autonomous vehicle 440 regarding reporting data for training and evaluating machine learning algorithms, requesting assistance from remote computing system 450 or a human operator via the remote computing system 450, software service updates, rideshare pickup and drop off instructions, etc.

The remote computing system 450 includes an analysis service 452 that is configured to receive data from autonomous vehicle 102 and analyze the data to train or evaluate machine learning algorithms for operating the autonomous vehicle 102. The analysis service 452 can also perform analysis pertaining to data associated with one or more errors or constraints reported by autonomous vehicle 102.

The remote computing system 450 can also include a user interface service 454 configured to present metrics, video, pictures, sounds reported from the autonomous vehicle 102 to an operator of remote computing system 450. User interface service 454 can further receive input instructions from an operator that can be sent to the autonomous vehicle 102.

The remote computing system 450 can also include an instruction service 456 for sending instructions regarding the operation of the autonomous vehicle 102. For example, in response to an output of the analysis service 452 or user interface service 454, instructions service 456 can prepare instructions to one or more services of the autonomous vehicle 102 or a co-pilot or passenger of the autonomous vehicle 102.

The remote computing system 450 can also include a rideshare service 458 configured to interact with ridesharing application 470 operating on (potential) passenger computing devices. The rideshare service 458 can receive requests to be picked up or dropped off from passenger ridesharing app 470 and can dispatch autonomous vehicle 102 for the trip. The rideshare service 458 can also act as an intermediary between the ridesharing app 470 and the autonomous vehicle wherein a passenger might provide instructions to the autonomous vehicle to 102 go around an obstacle, change routes, honk the horn, etc.

The remote computing system 450 can also include a cargo service 460. A user operating cargo application/website 475 can interact with the transportation service 460 to specify information regarding an item to be delivered using the autonomous vehicle 102.

In some embodiments, the cargo application/website 475 can also be used by users to directly schedule transportation jobs with the transportation service 460. The cargo application/website 475 can receive item dimensions, item weight, a destination address, etc. In some embodiments, a user can request that the autonomous vehicle 102 come to them to pick up the item for transport.

While the cargo application/website 475 has been shown to be separate from the ridesharing application 470, it will be appreciated by those of ordinary skill in the art that the cargo application/website 475 can be integrated with the ridesharing application 470.

In some embodiments, an online retailer or a shipping company can interface with transportation service 460 via an API to store items in cargo lockers 250 so electric vehicle 102 can provide last mile delivery services.

In some embodiments, when a user is meeting the autonomous vehicle to place an item in or to collect an item from cargo locker 250 the user autonomous cargo application/website 475 can communicate directly with the autonomous vehicle 102, however in other embodiments it may be more preferred to prevent direct communications between the autonomous cargo application/website 475 and the autonomous vehicle 102. In such embodiments, the autonomous cargo application/website 475 can communicate with remote computing system 450 which in turn can communicate with the autonomous vehicle 102. In such embodiments, it is not necessary for the autonomous vehicle 102 to actually receive the unlock code. Instead, the remote computing system 450 can verify the code and provide an instruction to the autonomous vehicle 102 to open its doors and/or cargo locker 250.

In some embodiments, a mechanism to unlock the car doors and to unlock the cargo locker 250 can be separate. In such embodiments, the user can be informed with specific instructions on how to unlock the cargo locker 250. It may be possible for the autonomous cargo application/website 475 to communicate directly with the cargo locker 250. In such embodiments, as when the autonomous cargo application/website 475 communicates directly with the cargo locker 250, the cargo locker 250 might have a separate communications channel to the transportation service 460 that avoids direct communications between the cargo locker 250 and the autonomous vehicle 102. The autonomous cargo application/website 475 can communicate with the cargo locker 250 to unlock the cargo locker 250, and the cargo locker 250 can communicate with the transportation service 460 to inform the transportation service of the code, or user that unlocked the cargo locker 250.

Whether the autonomous vehicle 102 receives the unlock code from the autonomous cargo application/website 475 or received an instruction from remote computing system 450, the autonomous vehicle can unlock its doors and open the cargo locker 250.

In addition to the fact that the user has presented the unlock code to the autonomous vehicle 102 (or to the remote computing system 450), the autonomous vehicle 102 and the remote computing system 450 can further be confident that it is the user interacting with the autonomous vehicle 102 because the autonomous vehicle 102 can record pictures and video of the user. In some embodiments, the autonomous vehicle 102 may include facial recognition technology to further increase the confidence that the right person is interacting with the autonomous vehicle 102.

The cargo locker 250 can determine that it has been closed and that an item is inside, or that an item has been removed. The cargo locker 250 can be outfitted with a switch to be able to detect when it is open or closed. Additionally, the cargo locker 250 can also include a weight sensor or a camera or both in order to verify that the cargo locker 250 contains an item or has been emptied. The cargo locker 250 can also notify autonomous vehicle 102 or remote computing system 450 that cargo has been received or delivered. The autonomous vehicle 102 or the cargo locker 250 can then send a notification to the transportation service 460 indicating that the item has been received or delivered.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 8:
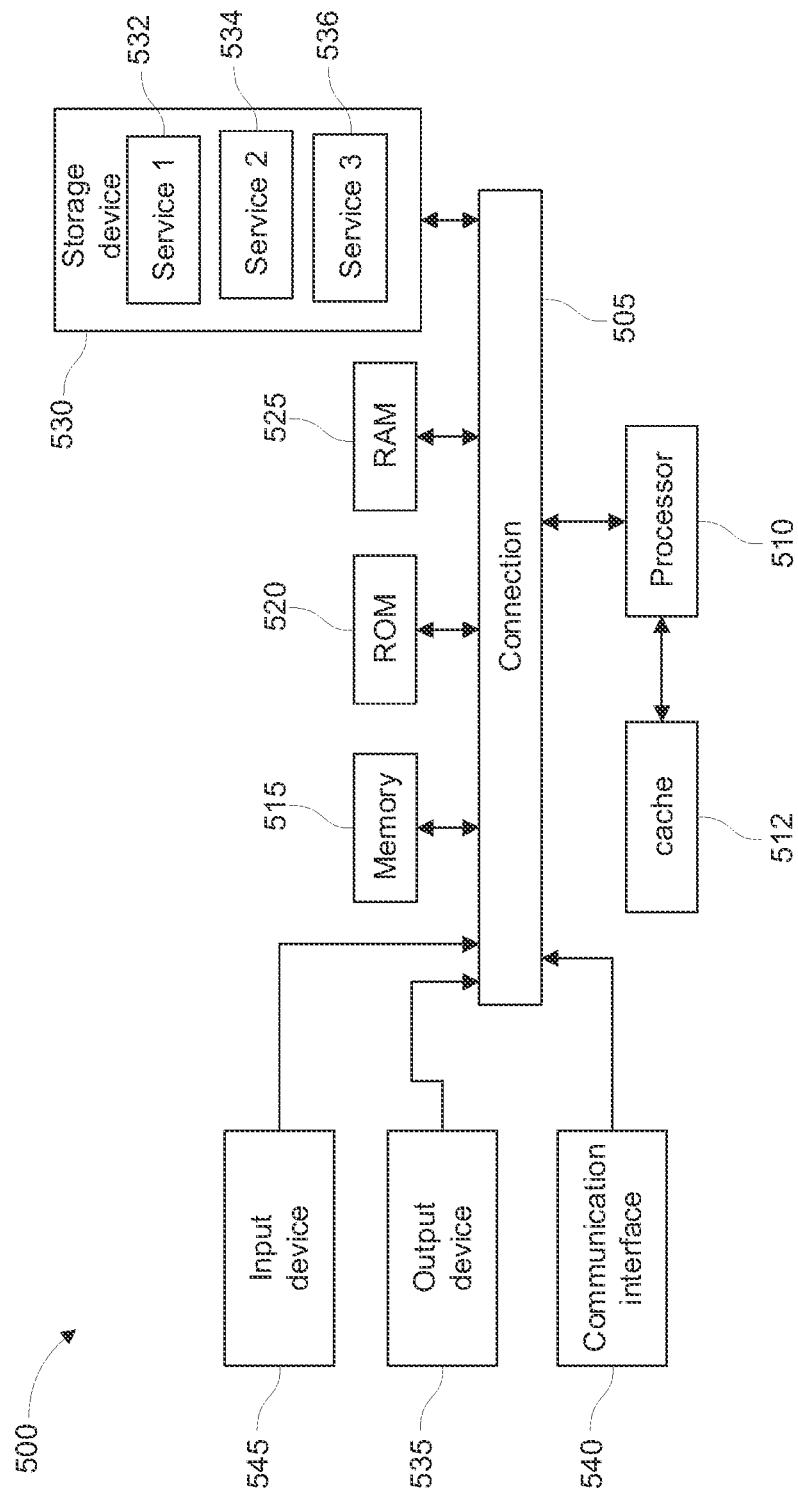
FIG. 8 shows an example of a computing system for implementing certain aspects of the present technology.

FIG. 8 shows an example of computing system 500, which can be for example any computing device making up internal computing system 410, remote computing system 450, (potential) passenger device executing rideshare app 470, cargo application/website 475, computer in cargo locker 250 or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A system comprising:
   a height adjustable dolly;
   a cargo locker configured to be transported to a vehicle by the height adjustable dolly;
   a cargo adapter configured to be transported to the vehicle by the height adjustable dolly, and to receive the cargo locker into the vehicle, wherein the cargo adapter comprises a spring-loaded lock that is mounted to an outside surface of the cargo adapter; and
   a hinge configured to reversibly receive the cargo adapter and allow the cargo adapter to translate from a vertical position to a horizontal position.

2. The system of claim 1, wherein the spring-loaded lock comprises a cam surface that facilitates depression of the spring-loaded lock.

3. The system of claim 2, wherein the cam surface is configured to allow transfer of a cargo box onto the cargo adapter.

4. The system of claim 3, wherein the cam surface is configured to automatically engage the spring-loaded lock once the cargo box is in place on the cargo adapter.

5. The system of claim 1, further comprising:
   a cargo locker platform associated with the height adjustable dolly, wherein the cargo locker platform is configured to support the cargo locker and forms a complimentary portion of a loading ramp with the cargo adapter when the cargo adapter is in the horizontal position.

6. The system of claim 1, further comprising:
   a proximity sensor attached to the height adjustable dolly, the proximity sensor configured to provide an indication when the height adjustable dolly is positioned in a certain distance from the vehicle to translate the cargo adapter from the vertical position to the horizontal position.

7. The system of claim 1, wherein the height adjustable dolly is configured with at least two preset heights, wherein a first height is substantially equal to a height of a floor of the vehicle, and wherein a second height is a lower height than the first height and is configured to carry the cargo locker.

8. The system of claim 1, further comprising a cargo anchor affixed to a structure of the vehicle other than a floor of a passenger compartment, wherein the structure of the vehicle comprises one or a side frame of the vehicle or a seat of the vehicle.

9. The system of claim 1, wherein the cargo adapter incudes roller bearings configured to guide a cargo box onto the cargo adapter.

10. The system of claim 9, wherein the cargo box is reversibly secured to the cargo adapter with a cotter pin.

11. The system of claim 1, wherein the cargo adapter includes at least one vertical strut configured to prevent movement in a first direction of movement of the cargo locker within a passenger compartment of the vehicle.

12. The system of claim 11, wherein the cargo adapter includes at least one clip which secures the cargo locker to the cargo adapter and prevents movement in a second direction that is orthogonal to the first direction.

* * * * *